United States Patent
Murata et al.

(10) Patent No.: US 10,435,314 B2
(45) Date of Patent: Oct. 8, 2019

(54) LIQUID TREATMENT APPARATUS

(71) Applicant: Panasonic Intellectual Property Management Co., Ltd., Osaka (JP)

(72) Inventors: Akiko Murata, Osaka (JP); Tatsushi Ohyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 186 days.

(21) Appl. No.: 15/411,708

(22) Filed: Jan. 20, 2017

(65) Prior Publication Data
US 2017/0225976 A1    Aug. 10, 2017

(30) Foreign Application Priority Data

Feb. 5, 2016  (JP) .................................. 2016-021293
Feb. 5, 2016  (JP) .................................. 2016-021369

(51) Int. Cl.
| C02F 1/46 | (2006.01) |
| B01J 19/08 | (2006.01) |
| C01B 13/11 | (2006.01) |
| C02F 1/467 | (2006.01) |
| C02F 1/50 | (2006.01) |

(Continued)

(52) U.S. Cl.
CPC .......... *C02F 1/4608* (2013.01); *B01J 19/088* (2013.01); *C01B 13/0248* (2013.01); *C01B 13/11* (2013.01); *C01B 21/203* (2013.01); *C02F 1/4676* (2013.01); *C02F 1/50* (2013.01); *B01D 53/04* (2013.01); *B01D 53/22* (2013.01); *B01D 2253/102* (2013.01); *B01D 2257/404* (2013.01); *B01J 2219/0809* (2013.01);
(Continued)

(58) Field of Classification Search
CPC ........ C02F 1/4608; C02F 1/4676; C02F 1/50; C02F 1/4672; C02F 1/72; C02F 1/78; C02F 2305/02; C02F 1/722; B01J 19/088; B01J 2219/0809; B01J 2219/0894; B01J 2219/0869; B01J 2219/0875; B01J 2219/0884; C01B 13/0248; C01B 13/11; C01B 21/203; B01D 53/04; B01D 53/22; B01D 2253/102; B01D 2257/404; C07C 407/00

See application file for complete search history.

(56) References Cited

U.S. PATENT DOCUMENTS

| 2014/0138029 A1* | 5/2014 | Narita .................. B08B 7/00 156/345.27 |
| 2015/0239759 A1* | 8/2015 | Kang .................. C02F 1/72 210/748.17 |
| 2016/0221942 A1* | 8/2016 | Morita .................. C07C 407/00 |

FOREIGN PATENT DOCUMENTS

| JP | 3-109920 | 5/1991 |
| JP | 2003-010625 | 1/2003 |

(Continued)

*Primary Examiner* — Xiuyu Tai
(74) *Attorney, Agent, or Firm* — McDermott Will & Emery LLP

(57) ABSTRACT

A liquid treatment apparatus comprises: a first tank in which a first gas containing nitrogen and oxygen and a liquid are stored; a plasma generating apparatus, including a first electrode and a second electrode, which effects discharge between the first electrode and the second electrode and thereby generates plasma that makes contact with at least part of the liquid; and a gas supply apparatus that supplies a first part of the first gas from the first tank to the plasma generating apparatus.

7 Claims, 8 Drawing Sheets

(51) Int. Cl.
  *C01B 21/20* (2006.01)
  *C01B 13/02* (2006.01)
  *B01D 53/04* (2006.01)
  *B01D 53/22* (2006.01)

(52) U.S. Cl.
  CPC .......................... *B01J 2219/0869* (2013.01); *B01J 2219/0875* (2013.01); *B01J 2219/0894* (2013.01); *C02F 1/4672* (2013.01)

(56) References Cited

FOREIGN PATENT DOCUMENTS

| | | |
|---|---|---|
| JP | 2003-236332 | 8/2003 |
| JP | 2009-148305 | 7/2009 |
| JP | 2010-202448 | 9/2010 |
| JP | 2011-050819 | 3/2011 |
| JP | 2014-032006 | 2/2014 |
| JP | 2014-159008 | 9/2014 |

\* cited by examiner

FIG. 3

| ITEMS ANALYZED | METHODS OF ANALYSIS | DISCHARGE DURATION | | |
|---|---|---|---|---|
| | | 0 MINUTE | 15 MINUTES | 45 MINUTES |
| NITROGEN | GC/TCD TECHNIQUE | 81 | 82 | 81 |
| OXYGEN | | 18 | 16 | 16 |
| HYDROGEN | GC/BID TECHNIQUE | 0.0003 | 0.31 | 0.41 |
| NITROGEN OXIDES ($NO_x$) | ION CHROMATOGRAPHY TECHNIQUE | 0.003 | 0.062 | 0.053 |
| MOISTURE | KARL FISCHER MOISTURE METER TECHNIQUE | 1.6 | 1.6 | 1.6 |

[UNIT: vol%]

LIQUID TREATMENT APPARATUS

BACKGROUND

1. Technical Field

The present disclosure relates to a liquid treatment apparatus that treats a liquid with plasma.

2. Description of the Related Art

There has conventionally been known an apparatus that stably purifies water in a water vessel of a humidifying unit of an air treatment apparatus (see, for example, Japanese Unexamined Patent Application Publication No. 2009-148305). The air treatment apparatus described in Japanese Unexamined Patent Application Publication No. 2009-148305 includes a discharge treatment unit in which discharge is performed so that an active species is produced, and is configured to supply a part of air containing the active species thus produced to an air purifier and to the water in the water vessel.

SUMMARY

One non-limiting and exemplary embodiment provides a useful liquid treatment apparatus.

In one general aspect, the techniques disclosed here feature a liquid treatment apparatus including: a first tank in which a first gas containing nitrogen and oxygen and a liquid are stored; a plasma generating apparatus, including a first electrode and a second electrode, which effects discharge between the first electrode and the second electrode and thereby generates plasma that makes contact with at least part of the liquid; and a gas supply apparatus that supplies a first part of the first gas from the first tank to the plasma generating apparatus.

The present disclosure makes it possible to provide a useful liquid treatment apparatus.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a table showing the results of an analysis of components of a gas confined in a route of circulation throughout the liquid treatment apparatus according to Embodiment 1;

DETAILED DESCRIPTION

Figure 1:
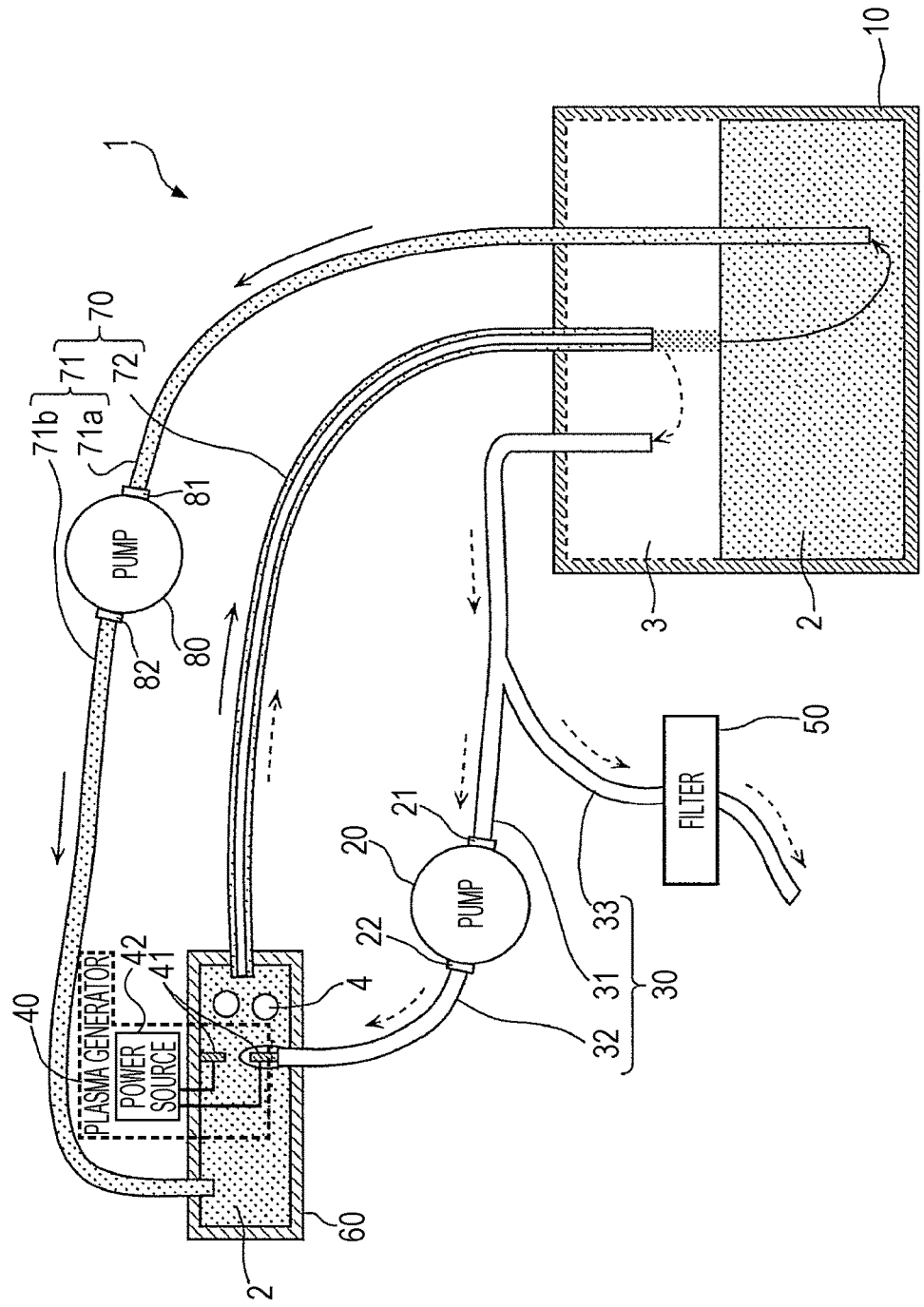
FIG. 1 is a diagram showing a configuration of a liquid treatment apparatus according to Embodiment 1.

The present inventors found that the conventional air treatment apparatus allows a gas that is generated from the discharge treatment unit to flow out of the apparatus. Since the gas that flows out contains a highly reactive gas, the apparatus can only be used in limited environments or conditions. Thus, the present inventors have conducted intensive studies in order to provide a liquid treatment apparatus that can be utilized in unlimited operating environments and operating conditions.

SUMMARY OF THE PRESENT DISCLOSURE

In one general aspect, the techniques disclosed here feature a liquid treatment apparatus including: a first tank in which a first gas containing nitrogen and oxygen and a liquid are stored; a plasma generating apparatus, including a first electrode and a second electrode, which effects discharge between the first electrode and the second electrode and thereby generates plasma that makes contact with at least part of the liquid; and a gas supply apparatus that supplies a first part of the first gas from the first tank to the plasma generating apparatus. The liquid treatment apparatus may further include: a first flow passage through which the first part of the first gas is guided from the first tank into the gas supply apparatus; and a second flow passage through which the first part of the first gas is guided from the gas supply apparatus into the plasma generating apparatus.

Thus, the gas supply apparatus collects the gas used in the generation of the plasma and supplies the gas to the area near the pair of electrodes. That is, the gas supply apparatus so circulates the gas used in the generation of the plasma that the gas is not emitted to the outside. Note here that, for example, in a case where the gas that is supplied by the gas supply apparatus contains nitrogen, nitrogen oxides may be produced by the generation of the plasma. With the aforementioned configuration, the gas supply apparatus also so circulates the nitrogen oxides produced by the generation of the plasma that the nitrogen oxides are not emitted to the outside. This makes it possible to reduce emissions of nitrogen oxide. With such a reduction in emissions of nitrogen oxide, the liquid treatment apparatus according to the aspect of the present disclosure can sufficiently reduce the influence on the outside. Therefore, the liquid treatment apparatus can be utilized in unlimited operating environments and operating conditions. That is, the liquid treatment apparatus can be utilized as a highly-versatile device.

Further, for example, the liquid treatment apparatus may further include: an exhaust flow passage through which a second part of the first gas in the first tank is emitted from the first tank; and a first filter, disposed on the exhaust flow passage, which removes nitrogen oxides from the second part of the first gas.

This makes it possible to emit nitrogen, oxygen, and the like to the outside without emitting the nitrogen oxides, as the liquid treatment apparatus includes a filter that blocks passage of the nitrogen oxides. This makes it possible to, by emitting nitrogen, oxygen, and the like to the outside, for example, in the case of a rise in internal pressure in the first tank, suppress the rise in internal pressure and thereby prevent the first tank from being deformed or damaged.

Further, since the gas supply apparatus and the filter can be disposed outside of the first tank, the degree of freedom with which the constituent members of the liquid treatment apparatus are arranged can be increased. Further, a route of circulation is formed in which a gas containing the nitrogen oxides circulates through the first tank, the first flow passage, the gas supply apparatus, the second flow passage, and the first tank in this order. This makes it easier, for example, to adjust the amount of gas that is supplied by the gas supply apparatus.

Further, for example, the exhaust flow passage may branch off from the first flow passage or the second flow passage.

This eliminates the need to provide the first tank with an outlet or the like, as the exhaust flow passage branches off from the first flow passage or the second flow passage. This makes it possible to enhance the hermeticity of the first tank and thereby prevent leakage of the nitrogen oxides.

Further, for example, the first electrode and the second electrode may be disposed inside of the first tank.

This eliminates the need to provide a dedicated reaction tank or the like, as the first tank can be utilized as a reaction tank in which plasma is generated. This makes it possible to reduce the number of components, thus making it possible to achieve reductions in size, weight, and cost of the liquid treatment apparatus.

Further, for example, the liquid treatment apparatus may further include: a housing, including an inlet and an outlet, which accommodates the first tank; a fan that produces, in the housing, a flow of a second gas that moves from the inlet to the outlet; and a second filter, having a principal surface intersecting the flow, which brings the liquid in the first tank and the second gas into contact with each other.

With this, the gas supply apparatus collects the gas containing the nitrogen oxides produced by the generation of the plasma and supplies the gas to the area near the pair of electrodes. That is, the gas supply apparatus circulates the nitrogen oxides so that the nitrogen oxides are not emitted to the outside. This makes it possible to reduce emissions of nitrogen oxides. With such a reduction in emissions of nitrogen oxide, the liquid treatment apparatus according to the aspect of the present disclosure can sufficiently reduce the influence on the outside. Therefore, the liquid treatment apparatus can be utilized in unlimited operating environments and operating conditions. That is, the liquid treatment apparatus can be utilized as a highly-versatile device.

Further, for example, the plasma generating apparatus may be configured such that nitrogen oxides are produced by generation of the plasma.

This makes it possible to prevent the nitrogen oxides produced by the generation of the plasma from being emitted to the outside.

A liquid treatment apparatus of another aspect of the present disclosure comprises: a first tank in which a part of a first gas containing nitrogen and oxygen and a part of a liquid are stored; a second tank in which another part of the first gas and another part of the liquid are stored; a plasma generating apparatus, including a first electrode and a second electrode, which effects discharge between the first electrode and the second electrode and thereby generates plasma that makes contact with the liquid in the second tank; a gas supply apparatus that supply a first part of the first gas from the first tank to the plasma generating apparatus; a first flow passage through which the first part of the first gas is guided from the first tank into the gas supply apparatus; a second flow passage through which the first part of the first gas is guided from the gas supply apparatus into the plasma generating apparatus; a third flow passage through which a part of the liquid in the first tank is guided form the first tank into the second tank; a fourth flow passage through which a part of the first gas in the second tank and a part of the liquid in the second tank are guided from the second tank into the first tank; and a liquid circulation apparatus that circulates the liquid through the first tank, the third flow passage, the second tank, and the fourth flow passage in this order.

This allows the liquid to circulate, thus making it possible to promote the dissolution in the liquid of the nitrogen oxides thus produced and the spread into the liquid of nitrous acid and dissolved ozone produced by the dissolution. This makes it possible to efficiently purify the liquid and efficiently remove contamination with the liquid having activity (decomposing power) by being purified.

Embodiments are described in detail below with reference to the drawings.

It should be noted that all of the embodiments described below serve as general or specific examples. Numerical values, shapes, materials, constituent elements, and the locations and topology of the constituent elements, steps, the orders of the steps, and the like that are shown in the embodiment below are examples, and are not intended to limit the present disclosure. Those of the constituent elements in the embodiment below which are not recited in an independent claim representing the most superordinate concept are described as optional constituent elements.

Further, each of the drawings is a schematic view and, as such, is not necessarily strictly illustrated. Therefore, for example, the drawings do not necessarily correspond in scale to each other. Further, substantially the same components are given the same reference numerals throughout the drawings, and duplication of description is omitted or simplified.

Embodiment 1

1. Overview

First, a brief overview of a liquid treatment apparatus according to Embodiment 1 is provided. FIG. 1 is a diagram showing a configuration of a liquid treatment apparatus 1 according to Embodiment 1.

The liquid treatment apparatus 1 generates plasma so that the plasma makes contact with a liquid 2. Specifically, the liquid treatment apparatus 1 supplies a gas 3 into the liquid 2 and generates plasma within the gas (bubbles 4) thus supplied. The plasma produces an active species that spreads through the liquid 2, and the spread of the active species through the liquid 2 makes it possible to decompose matter to be decomposed contained in the liquid 2, so that the liquid 2 is purified. Further, since the liquid 2 contains the active species, the liquid 2 can be utilized to decompose the matter to be decomposed such as contamination.

The matter to be decomposed is contaminants contained in the liquid 2. Examples of the matter to be decomposed include chemicals that are harmful to humans or ecosystems, fine particles or microorganisms, and the like.

The active species includes nitrogen oxides. Dissolution of the nitrogen oxides in the liquid 2 produces nitrous acid and nitric acid. Further, examples of the active species include a hydroxyl radical (OH radical), a hydrogen radical, an oxygen radical, a superoxide anion, a monovalent oxygen ion, hydrogen peroxide, and the like.

The liquid 2 is a liquid such as tap water or pure water. The gas 3 is a gas containing nitrogen ($N_2$) and oxygen ($O_2$).

An example of the gas 3 is air. Further, the gas 3 contains nitrogen oxides ($NO_x$) produced by the generation of the plasma.

2. Configuration

Next, the configuration of the liquid treatment apparatus 1 according to Embodiment 1 is described.

As shown in FIG. 1, the liquid treatment apparatus 1 includes a first tank 10, a gas supply pump 20, a first piping unit 30, a plasma generator 40, a filter 50, a second tank 60, a second piping unit 70, and a liquid supply pump 80. The first piping unit 30 forms a first flow passage 31, a second flow passage 32, and an exhaust flow passage 33, and the second piping unit 70 forms a third flow passage 71 and a fourth flow passage 72. The following describes the details of the constituent elements of the liquid treatment apparatus 1.

2-1. First Tank

The first tank 10 is a tank for storing the gas 3 and the liquid 2. The first tank 10 may have any outer shape such as a rectangular prism, a circular cylinder, or a sphere. In Embodiment 1, the first tank 10 has an internal space in which the gas 3 and the liquid 2 are stored.

The first tank 10 functions as a gas-liquid separation tank. That is, the liquid 2 and the gas 3 stored in the internal space in the first tank 10 are naturally separated by the effect of gravity so that the liquid 2 moves vertically downward in the internal space and the gas 3 moves vertically upward in the internal space. For this reason, as shown in FIG. 1, the gas 3 is stored in the upper part of the internal space in the first tank 10, and the liquid 2 is stored in the lower part of the internal space.

The internal space in the first tank 10 is enclosed except the parts connected with the first piping unit 30 and the second piping unit 70. That is, except the parts connected with the first piping unit 30 and the second piping unit 70, the first tank 10 has no opening through which the internal space and the outside communicate. This prevents the gas 3 from leaking to the outside except in a case where the gas 3 flows out of the internal space through the first piping unit 30, and also prevents the gas 3 from intruding into the inside except in a case where the gas 3 flows into the internal space through the second piping unit 70 (i.e. the fourth flow passage 72).

The first tank 10 is made, for example, of an acid-resistant resin or metal material or the like. For example, the first tank 10 is made of polyvinyl chloride, stainless steel, ceramic, or the like. It should be noted that in a case where the first tank 10 is made of a metal material, the first tank 10 may be subjected to plating, painting, or the like for rust-proof treatment.

It should be noted that the first tank 10 may include one or more openings through which the liquid 2 is replaced. The one or more openings are closed by a lid (or the liquid 2) or the like so that the gas 3 does not flow out at least for the duration of operation of the liquid treatment apparatus 1.

2-2. Gas Supply Pump

The gas supply pump 20 is an example of a gas supply apparatus that collects the gas 3 that is stored in the first tank 10 and supplies the gas 3 thus collected to an area near a pair of electrodes 41 of the plasma generator 40. Specifically, the gas supply pump 20 has a gas collection port 21 and a gas supply port 22. The gas supply pump 20 collects the gas 3 through the gas collection port 21 and emits the gas 3 thus collected through the gas supply port 22.

In Embodiment 1, the gas supply pump 20 is connected to the first tank 10 and the second tank 60 through the first piping unit 30 forming the first flow passage 31 and the second flow passage 32. Specifically, the first flow passage 31 is connected to the gas collection port 21, and the second flow passage 32 is connected to the gas supply port 22. That is, the gas supply pump 20 is disposed in the middle of the first piping unit 30 (i.e. between the first flow passage 31 and the second flow passage 32).

The gas supply pump 20 allows the gas 3 to flow through the first tank 10, the first flow passage 31, the second flow passage 32, and the second tank 60 in this order. The gas 3 having entered the second tank 60 is supplied to the first tank 10 through the fourth flow passage 72 with the flow of the liquid 2 formed by the liquid supply pump 80. That is, as shown in FIG. 1, the gas 3 circulates through the first tank 10, the first flow passage 31, the gas supply pump 20, the second flow passage 32, the second tank 60, the fourth flow passage 72, and the first tank 10 in this order. It should be noted that, in FIG. 1, the dashed arrows indicate the direction of flow of the gas 3.

2-3. First Piping Unit (Flow Passage)

The first piping unit 30 is a structure for forming flow passages through which the gas 3 flows. For example, the first piping unit 30 is formed from tubular members such as pipes, tubes, hoses. The first piping unit 30 is made of a resin material, a metal material, or the like that has resistance to an active gas, such as ozone, which is produced by the plasma. For example, the first piping unit 30 is made of fluororesin such as polytetrafluoroethylene, silicone rubber, stainless steel, or the like.

As shown in FIG. 1, the first piping unit 30 forms the first flow passage 31, the second flow passage 32, and the exhaust flow passage 33.

The first flow passage 31 is a flow passage through which the gas 3 containing nitrogen oxides is guided from the first tank 10 to the gas supply pump 20. As shown in FIG. 1, the first flow passage 31 has a first end (upstream end) connected to the upper part of the internal space in the first tank 10. For example, the upstream end is located in a position out of contact with the liquid 2 within the first tank 10 so that only the gas 3 passes through the inside of the first flow passage 31. The first flow passage 31 has a second end (downstream end) connected to the gas collection port 21 of the gas supply pump 20. The gas supply pump 20 sucks up the gas 3 stored in the upper part of the internal space in the first tank 10 and thereby collects the gas 3 through the first flow passage 31.

The second flow passage 32 is a flow passage through which the gas collected by the gas supply pump 20 is guided from the gas supply pump 20 to the area near the pair of electrodes 41. The second flow passage 32 has a first end (upstream end) connected to the gas supply port 22 of the gas supply pump 20 and a second end (downstream end) connected to the area near the electrode pair 41 disposed within the second tank 60. For example, the downstream end is connected to the root of one of the pair of electrodes 41 so that the gas having passed through the second flow passage 32 covers the electrode.

The exhaust flow passage 33 is a flow passage through which a part of the gas 3 that is stored in the first tank 10 is emitted. In Embodiment 1, as shown in FIG. 1, the exhaust flow passage 33 branches off from the first flow passage 31.

It should be noted that the exhaust flow passage 33 may alternatively branch off from the second flow passage 32. Alternatively, the exhaust flow passage 33 may be an opening provided in the first tank 10. That is, the first tank 10 may be provided with an exhaust opening as the exhaust gas passage 33, in addition to the opening through which the first tank 10 is connected to the first piping unit 30 (i.e. the first flow passage 31 and the second flow passage 32).

In Embodiment 1, heat is generated when the plasma generator 40 generates the plasma. The heat thus generated causes a rise in temperature of the gas 3, thus causing an increase in volume of the gas 3. Further, the evaporation of the liquid 2 at the interface between the plasma and the liquid 2 also causes an increase in volume. This causes an increase in internal pressure in the first tank 10. The exhaust flow passage 33 is provided for, in the case of an increase in volume of the gas 3, emitting the increase to the outside.

It should be noted that a valve (e.g. a check valve) may be provided in the part where the exhaust flow passage 33 branches off from the first flow passage 31. The valve opens in a case where the pressure of the gas 3 in the first tank 10 becomes higher than a predetermined threshold pressure. This makes it possible to suppress the rise in internal pressure in the first tank 10 or the like and thereby prevent the first tank 10, the first piping unit 30, and the like from being deformed or damaged.

2-4. Plasma Generator

The plasma generator 40 is an example of a plasma generating apparatus including the pair of electrodes 41 and a power source 42. The plasma generator 40 produces nitrogen oxides by effecting discharge between the electrodes 41 and thereby so generating plasma in the gas (bubbles 4) supplied by the gas supply pump 20 that the plasma makes contact with the liquid 2. A part of the nitrogen oxides thus produced dissolves in the liquid 2, and a part of the nitrogen oxides that did not dissolve in the liquid 2 is stored in the first tank 10. That is, the gas 3 that is stored in the first tank 10 contains not only nitrogen and oxygen but also gases, such as nitrogen oxides and ozone, produced by the plasma generator 40.

The pair of electrodes 41 are disposed inside of the second tank 60. Specifically, the pair of electrodes 41 are disposed to make contact with the liquid 2 stored in the second tank 60. The pair of electrodes 41 are made from two electrodes placed at a predetermined distance from each other, and one of the electrodes is covered with the gas supplied by the gas supply pump 20. The pair of electrodes 41 are for example a pair of rod electrodes, parallel plate electrodes, or the like.

The power source 42 applies a negative high-voltage pulse voltage, for example, of 2 to 50 kV/cm and 100 Hz to 20 kHz between the electrodes 41. This effects discharge in the gas (bubbles 4), generates plasma, and thereby produces nitrogen oxides.

2-5. Filter

The filter 50 is a filter that allows passage of a part of the gas 3 and blocks passage of nitrogen oxides. Specifically, the filter 50 allows passage of nitrogen and oxygen and blocks passage of nitrogen oxides. For example, the filter 50 may be a $NO_x$-dedicated filter or an activated carbon filter.

It should be noted that blocking passage of nitrogen oxides includes substantially blocking passage of nitrogen oxides while slightly allowing passage of nitrogen oxides instead of completely shut out nitrogen oxides. That is, the filter 50 needs only be a filter that makes the amount of passage of nitrogen oxides smaller than a predetermined threshold amount. For example, the amount of passage of nitrogen oxides through the filter 50 is smaller than a value prescribed by regulations such as environmental standards.

The filter 50 is disposed on the exhaust flow passage 33. That is, the gas 3 flowing through the exhaust flow passage 33 has its nitrogen oxides removed by the filter 50 when the gas 3 passes through the filter 50. With this, the gas 3 that is emitted through the exhaust flow passage 33 to the outside contains almost no nitrogen oxides.

2-6. Second Tank

The second tank 60 is a tank inside of which the pair of electrodes 41 are disposed. The second tank 60 may have any outer shape such as a rectangular prism, a circular cylinder, or a sphere. In Embodiment 1, the second tank 60 has an internal space in which the liquid 2 is stored. In the example shown in FIG. 1, the liquid 2 fills the entire internal space in the second tank 60, and the gas 3 only exists as the bubbles 4. Alternatively, the liquid 2 and the gas 3 may be separate from each other as they are in the first tank 10.

The second tank 60 functions as a reaction tank in which plasma is generated. Plasma is generated within the gas 3 (bubbles 4) supplied to the internal space in the second tank 60, so that nitrogen oxides and ozone are produced. The nitrogen oxides are supplied to the first tank 10 through the fourth flow passage 72 while dissolving in the liquid 2.

The internal space in the second tank 60 is enclosed except the parts connected with the first piping unit 30 and the second piping unit 70. That is, except the parts connected with the first piping unit 30 and the second piping unit 70, the second tank 60 has no opening through which the internal space and the outside communicate. This prevents the gas 3 from leaking to the outside except in a case where the gas 3 flows into the internal space through the first piping unit 30, and also prevents the gas 3 from intruding into the inside except in a case where the gas 3 flows out of the internal space through the second piping unit 70 (i.e. the fourth flow passage 72).

The second tank 60 is made, for example, of an acid-resistant resin or metal material or the like. For example, the second tank 60 is made of polyvinyl chloride, stainless steel, ceramic, or the like. It should be noted that in a case where the second tank 60 is made of a metal material, the second tank 60 may be subjected to plating, painting, or the like for rust-proof treatment.

It should be noted that the second tank 60 may be a part of the second piping unit 70. That is, the pair of electrodes 41 may be disposed inside of the second piping unit 70.

2-7. Second Piping Unit

The second piping unit 70 is a structure for forming flow passages through which the liquid 2 flows. For example, the second piping unit 70 is formed from tubular members such as pipes, tubes, hoses. The second piping unit 70 is made of an acid-resistant resin or metal material or the like. For example, the second piping unit 70 is made of polyvinyl chloride, polytetrafluoroethylene, stainless steel, or the like.

As shown in FIG. 1, the second piping unit 70 forms the third flow passage 71 and the fourth flow passage 72.

The third flow passage 71 is a flow passage through which the liquid 2 in the first tank is guided to the second tank 60. Specifically, the third flow passage 71 has an upstream part 71a and a downstream part 71b. The liquid supply pump 80 is connected between the upstream part 71a and the downstream part 71b.

The upstream part 71a is a flow passage through which the liquid 2 in the first tank 10 is guided to the liquid supply pump 80. The upstream part 71a has a first end (upstream end) located in a position in contact with the liquid 2 in the internal space in the first tank 10. For example, the upstream end of the upstream part 71a may be connected to a bottom surface of the first tank 10. The upstream part 71a has a second end (downstream end) connected to an inlet 81 of the liquid supply pump 80.

The downstream part 71b is a flow passage through which the liquid 2 is guided from the liquid supply pump 80 to the second tank 60. The downstream part 71b has a first end (upstream end) connected to an outlet 82 of the liquid supply pump 80. The downstream part 71b has a second end (downstream end) connected to the second tank 60.

The fourth flow passage 72 is a flow passage through which the gas 3 supplied to the area near the pair of electrodes 41 within the second tank 60 and the liquid 2 that is stored in the second tank 60 are guided to the first tank 10. Reduced to its simplest terms, the fourth flow passage 72 is a flow passage through which both the gas 3 and the liquid 2 flow. Specifically, the fourth flow passage 72 is a part of a route of circulation of the gas 3 and also a part of a route of circulation of the liquid 2. The fourth flow passage 72 has a first end (upstream end) connected to the second tank 60 and a second end (downstream end) connected to the first tank 10. As shown in FIG. 1, the downstream end may be located in the upper part of the internal space in the first tank 10. Alternatively, as with the upstream end of the upstream part 71a of the third flow passage 71, the downstream end may be located in contact with the liquid 2 in the lower part of the internal space.

2-8. Liquid Supply Pump

The liquid supply pump 80 is an example of a liquid supply apparatus that circulates the liquid 2 through the first tank 10, the third flow passage 71, the second tank 60, and the fourth flow passage 72 in this order. Specifically, the liquid supply pump 80 has the inlet 81 and the outlet 82. The liquid supply pump 80 sucks in the liquid 2 through the inlet 81 and releases the liquid 2 thus sucked in through the outlet 82. This causes the liquid 2 stored in the first tank 10 to be circulated through the upstream part 71a of the third flow passage 71, the liquid supply pump 80, the downstream part 71b of the third flow passage 71, the second tank 60, the fourth flow passage 72, and the first tank 10 in this order. It should be noted that, in FIG. 1, the solid arrows indicate the direction of flow of the liquid 2.

The liquid supply pump 80 is disposed in the middle of the second piping unit 70. Specifically, the liquid supply pump 80 is connected between the upstream 71a of the third flow passage 71 and the downstream part 71b. Alternatively, the liquid supply pump 80 may be disposed within the first tank 10 or the second tank 60.

3. Emissions of Nitrogen Oxide

The following describes emissions of nitrogen oxide from the liquid treatment apparatus 1 according to Embodiment 1.

As mentioned above, in the liquid treatment apparatus 1 according to Embodiment 1, the gas supply pump 20 circulates the gas 3 for use in the generation of plasma. The liquid treatment apparatus 1 is provided with no flow passage other than the exhaust flow passage 33 through which the gas 3 is emitted to the outside. In the following, emissions of nitrogen oxide were measured using as a comparative example a device that does not circulate a gas, as well as the liquid treatment apparatus 1. The results of the measurements are shown in FIG. 2.

Figure 2:
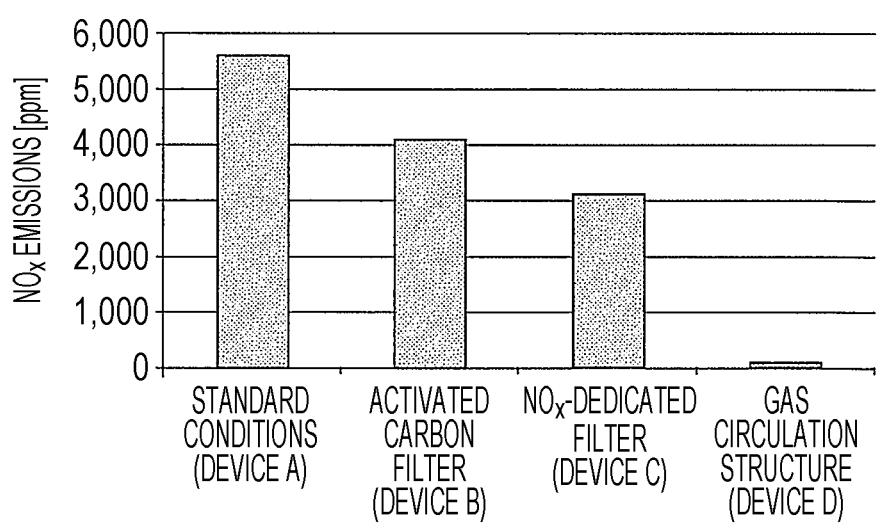
FIG. 2 is a graph showing emissions of nitrogen oxide ($NO_x$) from the liquid treatment apparatus according to Embodiment 1.

FIG. 2 is a graph showing emissions of nitrogen oxide from the liquid treatment apparatus 1 according to Embodiment 1. Specifically, FIG. 2 shows emissions of nitrogen oxide from a device A under "standard conditions", a device B with an "activated carbon filter", a device C with a "$NO_x$-dedicated filter", and a device D (liquid treatment apparatus 1) having a "gas circulation structure" according to Embodiment 1, starting from the left.

The device A under "standard conditions" is a comparative example of the liquid treatment apparatus 1 according to Embodiment 1, and is configured to, without circulating the gas 3, directly emit a gas utilized in the generation of plasma and a gas produced by the generation of the plasma. That is, the device A under "standard conditions" includes no filter through which the gases are emitted.

The device B with an "activated carbon filter" is a device with an activated carbon filter in a part of the device A under "standard conditions" through which the gases are emitted. The activated carbon filter was a cylindrical filter 50 mm in diameter and 180 mm in length.

The device C with a "$NO_x$-dedicated filter" is a device with a $NO_x$-dedicated filter in the part of the device A under "standard conditions" through which the gases are emitted. The $NO_x$-dedicated filter was a cylindrical filter 70 mm in diameter and 100 mm in length.

The device D having a "gas circulation structure" is equivalent to the liquid treatment apparatus 1 according to Embodiment 1. The filter 50 of the device D was the same activated carbon filter as that of the device B.

In this example, emissions of nitrogen oxide were measured with the devices A to D operating under the following common conditions. Specifically, the power source 42 applied an input power of 90 W, which effected discharge between the electrodes 41 and thereby generated plasma. The volume of the liquid 2 stored in the first tank 10 was 200 cc. Further, a solution of nitric acid at a concentration of 10% was added to the liquid 2. The gas supply pump 20 supplied the gas 3 to the area near the pair of electrodes 41 at a flow rate of 0.3 L/min. It should be noted that, in this example, the liquid 2 was circulated at a flow rate of 0.3 L/min.

Measurements of nitrogen oxide were taken by a NOx measuring apparatus measuring amounts of nitrogen oxide in 1 $m^3$ boxes in which each separate device was placed. Values obtained by converting actual measured values in terms of device sizes are shown as emissions of nitrogen oxide from each separate device.

As a result, as shown in FIG. 2, emissions of nitrogen oxide from the device A were approximately 5600 ppm. Emissions of nitrogen oxide from the devices B and C were approximately 4000 ppm and approximately 3000 ppm, respectively. As opposed to these, emissions of nitrogen oxide from the device D (liquid treatment apparatus 1) according to Embodiment 1 were approximately 71 ppm.

All these show that whereas the use of an activated carbon filter or a $NO_x$-dedicated filter reduced emissions of nitrogen oxide to approximately 0.5 times to approximately 0.7 times as much as that in the case of no filter, the utilization of an activated carbon filter with the circulation of gases reduced emissions of nitrogen oxide to approximately 1/80. This shows that emissions of nitrogen oxide can be sufficiently reduced by circulating the gases with the gas supply pump 20 and providing the exhaust flow passage 33 with the filter 50 as in the case of the liquid treatment apparatus 1 according to Embodiment 1.

Further, although not illustrated, emissions of nitrogen oxide in the case of use of a $NO_x$-dedicated filter as the filter 50 were approximately 88 ppm. Therefore, emissions of nitrogen oxide are as sufficiently reduced as they are in the case of an activated carbon filter.

For confirmation of the absence of differences depending on the results of the measurements, measurements of nitrogen oxide from the device D (liquid treatment apparatus 1) were also taken using other techniques. For example, in a case where emitted gases were completely collected with a sampling bag (2 cc/min), emissions of nitrogen oxide were approximately 71 ppm. In a case where nitrogen oxides were dissolved in water at 20° C. using an impinger, emissions of nitrogen oxide were approximately 93 ppm. In a case where nitrogen monoxide of the nitrogen oxides was changed into nitrogen dioxide using ozone gas and in a case where the nitrogen oxides were further dissolved in water at 20° C. using an impinger, emissions of nitrogen oxide were approximately 93 ppm and approximately 101 ppm, respectively.

As stated above, all these measuring techniques show that emissions of nitrogen oxide are sufficiently reduced.

4. Decomposability Attributed to Circulation of Gas

Next, for confirmation of the absence of a decrease in treatability of the liquid 2 by the liquid treatment apparatus 1 due to the circulation of the gas 3, components of the gas 3 in the route of circulation were confirmed first. The results of confirmation of component changes in the gas 3 are shown in FIG. 3.

FIG. 3 is a table showing the results of an analysis of the components of the gas 3 confined in the route of circulation throughout the liquid treatment apparatus 1. Specifically, FIG. 3 shows the volume percentages of nitrogen, oxygen, hydrogen, nitrogen oxides, and moisture in the gas at the points in time where the discharge duration was 0 minute (before the start of discharge), 15 minutes, and 45 minutes.

As shown in FIG. 3, nitrogen and oxygen were measured using a GC/TCD technique (gas chromatography/thermal conductivity detector technique), and hydrogen was measured using a GC/BID technique (gas chromatography/barrier discharge ion detector technique). Nitrogen oxides were measured using an ion chromatography technique, and moisture was measured using a Karl Fischer moisture meter technique.

As shown in FIG. 3, nitrogen, oxygen, and moisture exhibit almost no differences between the point in time before the start of discharge (0 minute) and the point in time where 45 minutes had elapsed since the start of discharge. That is, the generation of plasma effects almost no decrease or increase in nitrogen, oxygen, or moisture.

In Embodiment 1, nitrogen oxides are produced by generating plasm in the gas 3 containing nitrogen and oxygen, and nitrous acid is produced by the nitrogen oxides thus produced dissolving in the liquid 2. Since there is no large change in the component ratio of nitrogen to oxygen even in a case where the discharge duration is long, it is considered that the production of nitrous acid can ensue.

On one hand, hydrogen and nitrogen oxides are bigger in amount after the start of discharge (15 minutes or 45 minutes) than before the start of discharge (0 minute). This shows that the generation of plasma led to the production of hydrogen and nitrogen oxides. On the other hand, hydrogen is not much bigger (and nitrogen oxides are smaller) in amount 45 minutes after the start of discharge than 15 minutes after the start of discharge. This suggests that a continuation of the generation of plasma does not lead to a large change in the ratio of components in the gas 3.

Then, the concentration of acetic acid ($CH_3COOH$) was measured with the liquid treatment apparatus 1 operating with an acetic acid aqueous solution. The results of the measurements are shown in FIG. 4.

Figure 4:
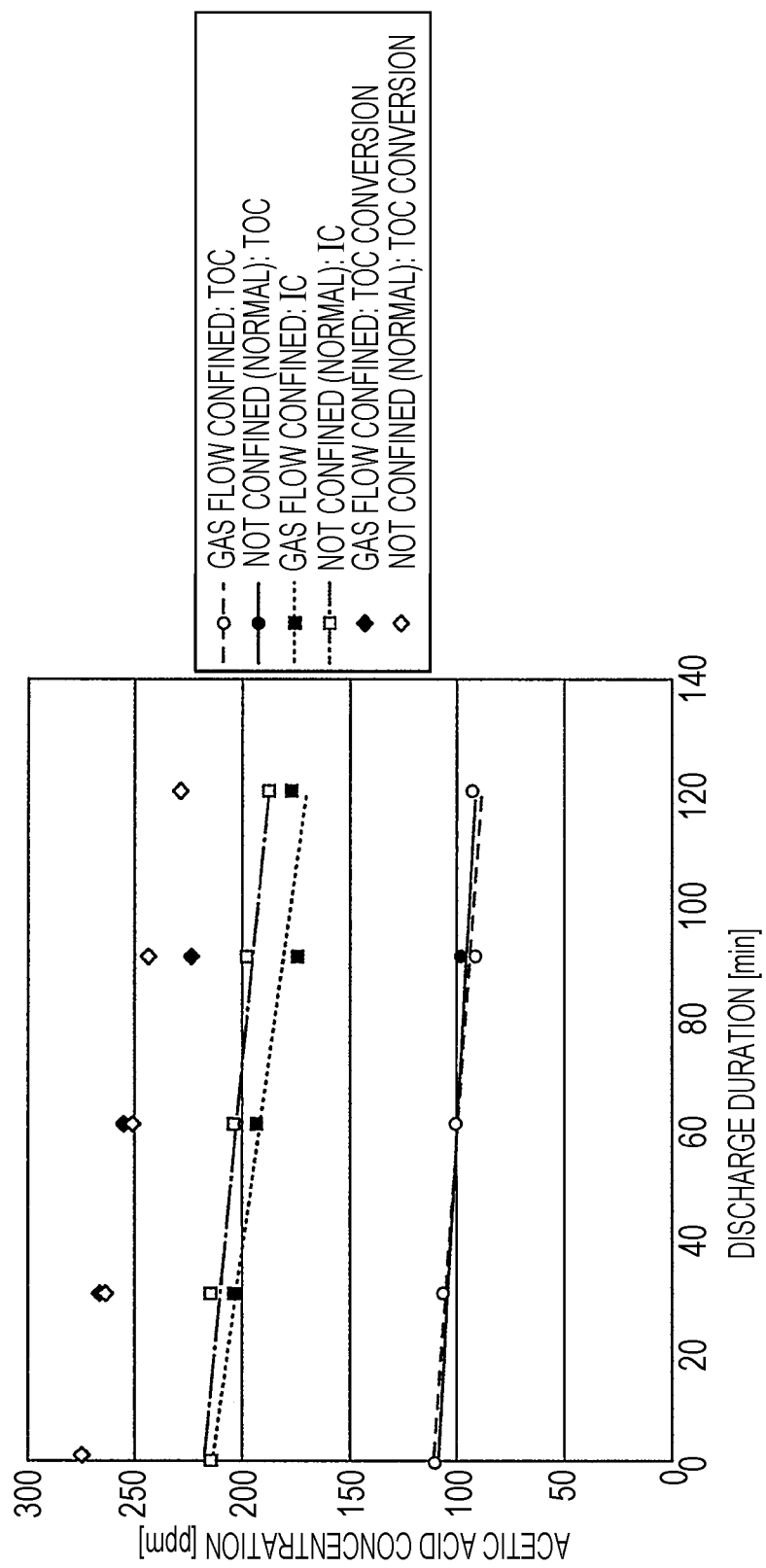
FIG. 4 is a graph showing the concentration of acetic acid as a function of discharge duration in a case where acetic acid is decomposed using the liquid treatment apparatus according to Embodiment 1.

FIG. 4 is a graph showing the concentration of acetic acid as a function of discharge duration in a case where acetic acid is decomposed using the liquid treatment apparatus according to Embodiment 1. In FIG. 4, the horizontal axis represents discharge duration (i.e. the duration of generation of plasma), and the vertical axis represents the concentration of acetic acid.

The concentration of acetic acid was measured using an ion chromatography technique or a TOC (total organic carbon) meter. In FIG. 4, the legend "IC" represents the ion chromatography technique, and the legend "TOC" represents the quantity of carbon atoms as measured using the TOC meter. The legend "TOC equivalent" represents values of acetic acid concentration as calculated on the basis of the results of the measurements of "TOC". Specifically, a "TOC equivalent" is obtained by multiplying the ratio (=60/24) of the molecular weight (60) of acetic acid to the molecular weight (12×2) of carbon contained in the acetic acid molecules ($CH_3COOH$) by a result of a measurement of "TOC".

A comparison between the case where the gas 3 was not confined (e.g. the aforementioned device A) and the case where the gas 3 was confined and circulated (i.e. the aforementioned device D) shows that the proportions of decreases in concentration of acetic acid were substantially the same. It should be noted that although the results of the measurement by the ion chromatography technique and the results of the measurement using the TOC meter differed in the absolute values of the concentration of acetic acid, the amounts of decrease in concentration exhibited substantially the same trends.

All these show that the decomposability of acetic acid remained substantially the same regardless of whether the gas 3 was confined. Therefore, there is no decrease in treatability of the liquid 2 even in a case where the gas 3 is circulated as in the case of the liquid treatment apparatus 1 according to Embodiment 1. Therefore, the liquid treatment apparatus 1 according to Embodiment 1 makes it possible to suppress the production of nitrogen oxides without a decrease in treatability.

5. Summary

As described above, a liquid treatment apparatus 1 according to Embodiment 1 includes: a first tank 10 in which a gas 3 containing nitrogen and oxygen and a liquid 2 are stored; a gas supply pump 20 that collects the gas 3 that is stored in the first tank 10 and supplies the gas 3 thus collected to an area near a pair of electrodes 41; a plasma generator 40, including the pair of electrodes 41, which produces nitrogen oxides by effecting discharge between the electrodes 41 and thereby so generating plasma in the gas 3 supplied by the gas supply pump 20 that the plasma makes contact with the liquid 2; an exhaust flow passage 33 through which a part of the gas that is stored in the first tank 10 is emitted; and a filter 50, disposed on the exhaust flow passage 33, which allows passage of a part of the gas 3 and blocks passage of the nitrogen oxides, wherein the gas 3 that is stored in the first tank 10 contains the nitrogen oxides produced by the plasma generator 40.

This reduces emissions of nitrogen oxides and reduces damage or the like to the first tank 10, thus making it possible to sufficiently reduce the influence on the outside. Therefore, the liquid treatment apparatus 1 can be utilized in unlimited operating environments and operating conditions. That is, the liquid treatment apparatus 1 can be utilized as a highly-versatile device.

Modification

The following describes a liquid treatment apparatus according to a modification of Embodiment 1.

Figure 5:
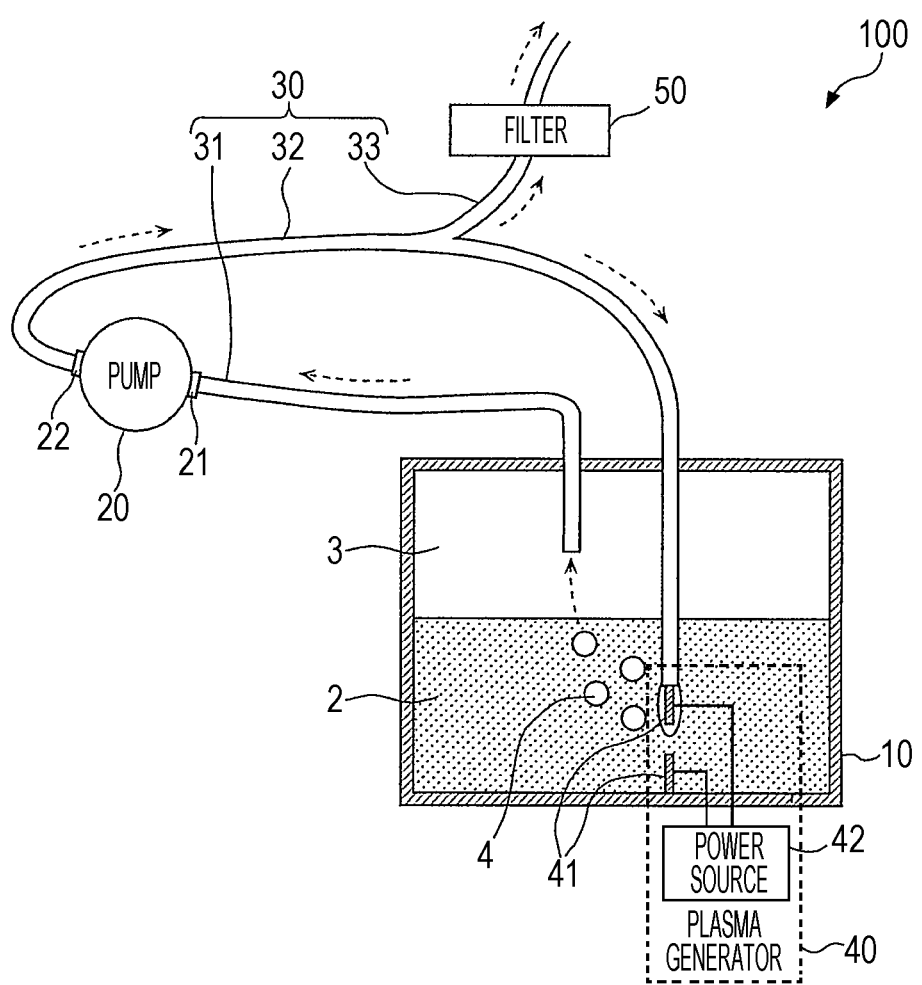
FIG. 5 is a diagram showing a configuration of a liquid treatment apparatus according to a modification of Embodiment 1.

FIG. 5 is a diagram showing a configuration of a liquid treatment apparatus 100 according to the present modification. As shown in FIG. 5, the liquid treatment apparatus 100 differs from the liquid treatment apparatus 1 according to Embodiment 1 shown in FIG. 1 in that the liquid treatment apparatus 100 does not include the second tank 60, the second piping unit 70, or the liquid supply pump 80. That is, the liquid treatment apparatus 100 according to the present modification does not circulate the liquid 2.

In the present modification, as shown in FIG. 5, the pair of electrodes 41 of the plasma generator 40 are disposed within the first tank 10. Therefore, the second flow passage 32, through which the gas 3 is supplied to the area near the pair of electrodes 41, is connected to the first tank 10.

In the present modification, the gas supply pump 20 allows the gas 3 to flow through the first tank 10, the first flow passage 31, the second flow passage 32, and the first tank 10 in this order. That is, the gas 3 circulates through the first tank 10, the first flow passage 31, the gas supply pump 20, the second flow passage 32, and the first tank 10 in this order. It should be noted that although FIG. 5 shows an example where the exhaust flow passage 33 branches off from the second flow passage 32, the exhaust flow passage 33 may alternatively branch off from the first flow passage 31 as in the case of Embodiment 1.

According to the present modification, the number of components can be reduced, as the liquid treatment apparatus 100 does not need to include the second tank 60 or the like. This makes it possible to achieve reductions in size, weight, and cost of the liquid treatment apparatus 1.

Embodiment 2

Next, a liquid treatment apparatus according to Embodiment 2 is described. Embodiment 2 represents an example of application of the liquid treatment apparatus 1 according to Embodiment 1 to the field of deodorizing. That is, the liquid treatment apparatus according to Embodiment 2 functions as a deodorizing apparatus. It should be noted that since the liquid treatment apparatus according to Embodiment 2 is identical to the liquid treatment apparatus 1 according to Embodiment 1 in terms of circulation of gas, the descriptions of emissions of nitrogen oxide and decomposability attributed to circulation of gas are omitted, as they are the same as those given in connection with the liquid treatment apparatus 1 according to Embodiment 1.

1. Overview

Figure 6:
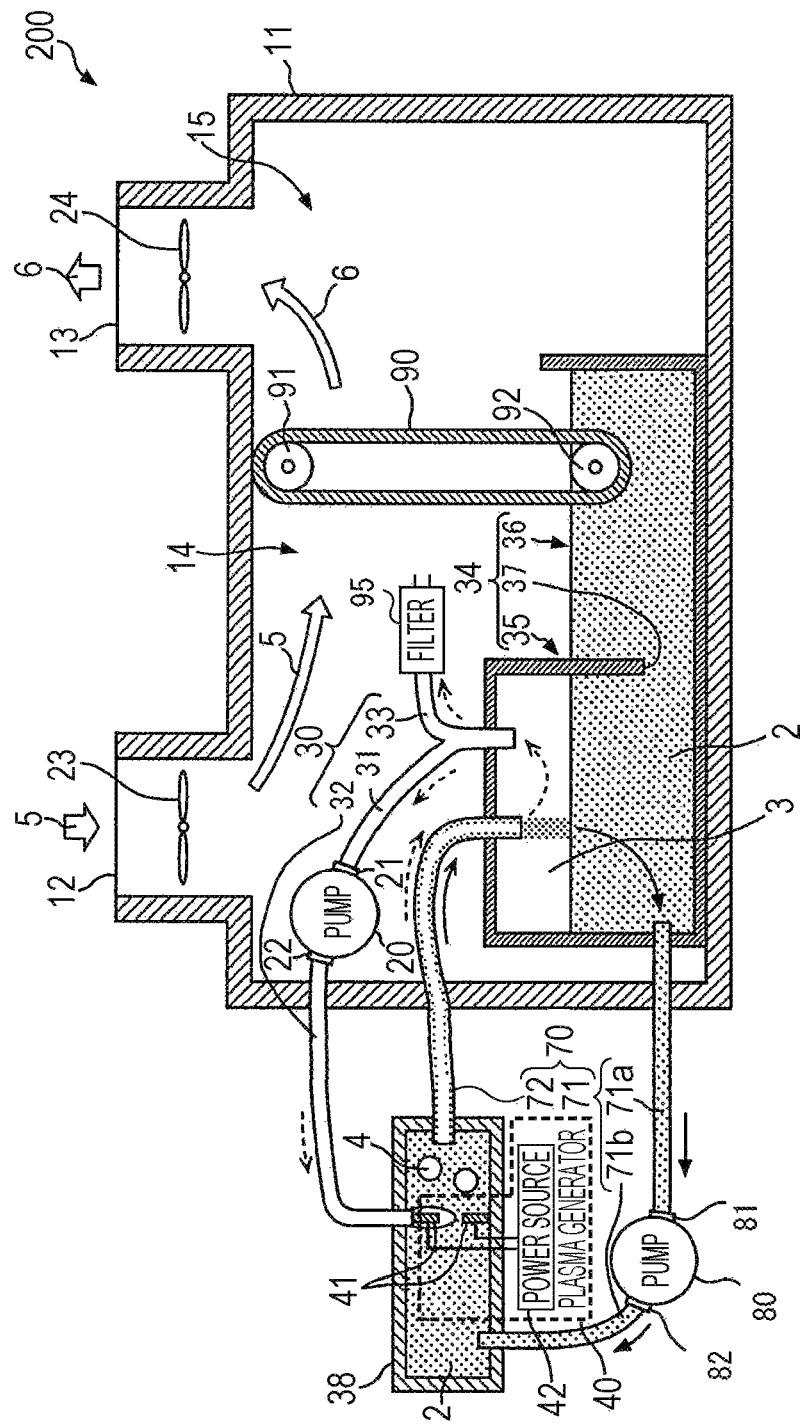
FIG. 6 is a diagram showing a configuration of a liquid treatment apparatus according to Embodiment 2.

First, a brief overview of a liquid treatment apparatus according to Embodiment 2 is provided. FIG. 6 is a diagram showing a configuration of a liquid treatment apparatus 200 according to Embodiment 2.

The liquid treatment apparatus 200 decomposes a malodorous substance contained in a gas 5 by utilizing an active species, such as nitrogen oxides, which is produced by plasma. The malodorous substance is a substance, such as ammonia or hydrogen sulfide, which gives out an odor. In Embodiment 2, the liquid treatment apparatus 200 decomposes malodorous substances, such as ammonia and hydrogen sulfide, contained in air.

It should be noted that the liquid treatment apparatus 200 may decompose not only malodorous substances but also matter to be decomposed such as other harmful substances, contaminants, and the like. Examples of the matter to be decomposed include chemicals that are harmful to humans or ecosystems, fine particles or microorganism such as pollens and house dust, and the like.

In Embodiment 2, the liquid treatment apparatus 200 generates plasma so that the plasma makes contact with the liquid 2. Specifically, the liquid treatment apparatus 200 supplies the gas 3 into the liquid 2 and generates plasma in the gas 3 (bubbles 4) thus supplied. The plasma produces an active species that spreads through the liquid 2, and the spread of the active species through the liquid 2 allows the liquid 2 to decompose matter to be decomposed such as malodorous substances.

The liquid treatment apparatus 200 takes in the gas 5 from the outside and brings the gas 5 thus taken in and the liquid 2 into contact with each other through a first filter 90. When the gas 5 contains the matter to be decomposed, the liquid 2 decomposes the matter contained in the gas 5, so that the liquid treatment apparatus 200 emits a purified gas 6 to the outside.

The liquid 2 is a liquid such as tap water or pure water. The gas 3 is an example of a second gas containing nitrogen ($N_2$) and oxygen ($O_2$). An example of the gas 3 is air. Further, the gas 3 contains nitrogen oxides ($NO_x$) produced by the generation of the plasma.

The gas 5 is an example of a first gas containing the matter to be decomposed. An example of the gas 5 is air. The gas 5 contains, for example, ammonia and the like. The gas 5 is the gas to be purified by the liquid 2. The gas 6 is the gas 5 purified by the liquid 2.

The liquid treatment apparatus 200 is utilized, for example, in an air purifier or the like. The liquid treatment apparatus 200 is placed in a predetermined space such as the inside of a room to purify air in the space. Alternatively, the liquid treatment apparatus 200 may be provided in an apparatus, such as a refrigerator, a microwave oven, or a fryer, which is used for preserving or cooking food. Alternatively, the liquid treatment apparatus 200 may be provided in an air conditioner, a humidifier, a washing machine, a dish washer, a vehicle, or the like.

2. Configuration

Next, the configuration of the liquid treatment apparatus 200 according to Embodiment 2 is described.

As shown in FIG. 6, the liquid treatment apparatus 200 includes a housing 11, fans 23 and 24, a first tank 34, a second tank 38, a first filter 90, a gas supply pump 20, a liquid supply pump 80, a plasma generator 40, a first piping unit 30, a second piping unit 70, and a second filter 95. The following describes the details of the constituent elements of the liquid treatment apparatus 200.

2-1. Housing

The housing 11 is a housing that constitutes the contour of the liquid treatment apparatus 200. For example, the housing 11 is made of a resin material such as plastic or a metal material. The housing 11 may have any outer shape such as a rectangular prism or a sphere. As shown in FIG. 6, the housing 11 has an inlet 12 and an outlet 13.

Figure 7:
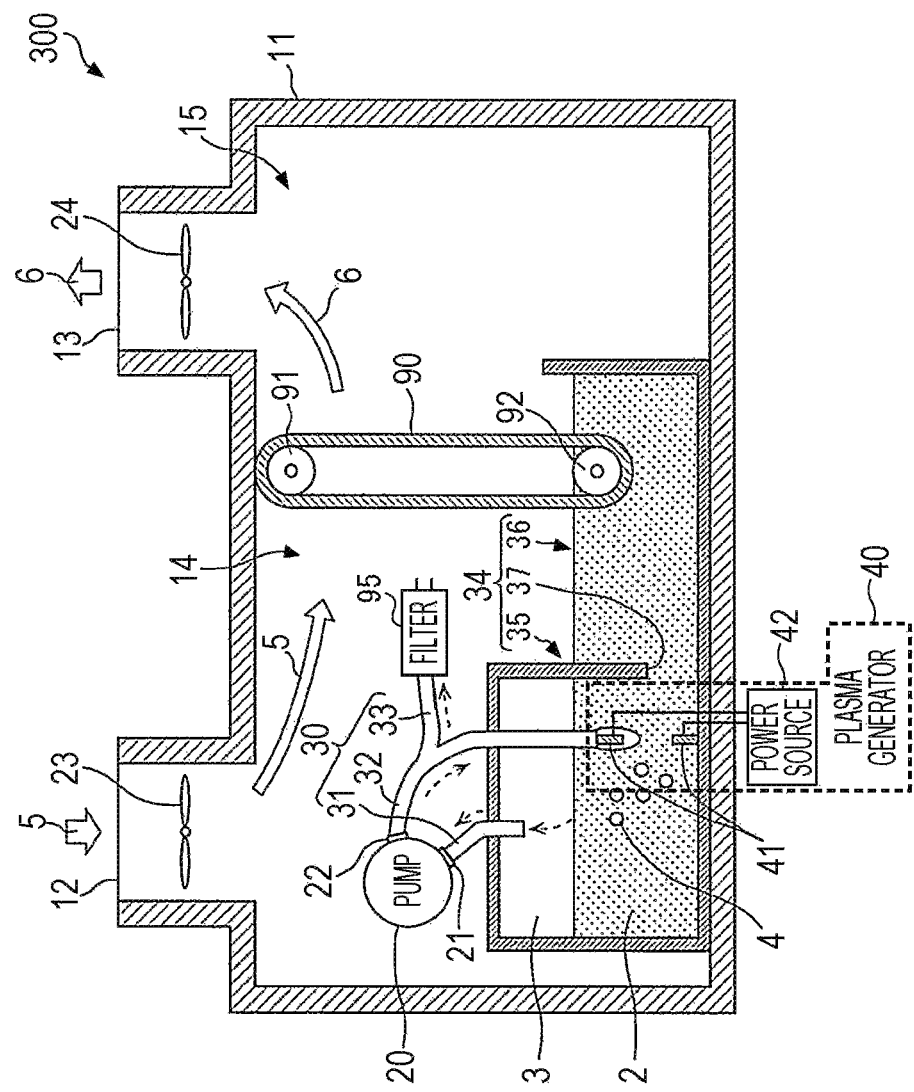
FIG. 7 is a diagram showing a configuration of a liquid treatment apparatus according to Modification 1 of Embodiment 2.

The inlet 12 is an opening through which the gas 5 is taken into the housing 11 from the outside. The outlet 13 is an opening through which the gas 5 taken into the housing 11 is emitted to the outside. As shown in FIG. 7, the gas 5, such as air containing malodorous substances, is taken into the housing 11 through the inlet 12, passes through the first filter 90, and is then emitted out of the housing 11 through the outlet 13. The gas 6, which is emitted out of the housing 11, has been purified by removal of the malodorous substances and the like.

As shown in FIG. 6, the inlet 12 and the outlet 13 are provided in an upper surface of the housing 11. It should be noted that the positions in which the inlet 12 and the outlet 13 are provided are not limited to the example shown in FIG. 6. For example, the inlet 12 and the outlet 13 may be provided in side and lower surfaces, respectively, of the housing 11.

For example, the inlet 12 and the outlet 13 may be provided in side surfaces of the housing 11 in such a way as to face each other. This allows the inlet 12 and the outlet 13 to be placed at a longer distance from each other, thus ensuring a space between the inlet 12 and the outlet 13 in which the first filter 90 is provided and allowing the gases to smoothly flow from the inlet 12 to the outlet 13. Further, the housing 11 may have a plurality of at least either the inlet 12 or the outlet 13.

The inside of the housing 11 is divided by the first filter 90 into a first space 14 and a second space 15. The first space 14 is a space that includes the inlet 12. The second space 15 is a space that includes the outlet 13. The first space 14 and the second space 15 are separated from each other by the inner walls of the housing 11, the first filter 90, the liquid 2, and the first tank 34 so that the gas 5 does not move between the first space 14 and the second space 15 without passing through the first filter 90.

2-2. Fans

The fan 23 produces a gas flow so that the gas 5 is taken into the housing 11 through the inlet 12. As shown in FIG. 6, the fan 23 is provided in the inlet 12. It should be noted that, instead of being provided in the inlet 12, the fan 23 may be provided outside or inside (in the first space 14) of the housing 11. The fan 24 produces a gas flow so that the gas 6 is emitted out of the housing 11 through the outlet 13. As shown in FIG. 6, the fan 24 is provided in the outlet 13. It should be noted that, instead of being provided in the outlet 13, the fan 24 may be provided outside or inside (in the second space 15) of the housing 11.

The fans 23 and 24 are driven by a control circuit (not illustrated). Operation of the fans 23 and 24 causes a gas flow to be produced by gases flowing in a direction from the inlet 12 toward the outlet 13. Passage of the gas flow through the first filter 90 brings the gas 5 forming the gas flow into contact with the liquid 2. The matter to be decomposed contained in the gas 5 is decomposed by an active species, such as nitrous acid and dissolved ozone, contained in the liquid 2.

It should be noted that although Embodiment 2 shows an example where the liquid treatment apparatus 200 includes the two fans 23 and 24, the liquid treatment apparatus 200 may alternatively include only one or three or more fans. The disposition of fans is not limited to the example shown in FIG. 6, either. For example, a fan may be disposed within the first space 14 or the second space 15.

2-3. First Tank

The first tank 34 is a vessel, disposed within the first housing 11, in which the gas 3 and the liquid 2 are stored. The first tank 34 includes an enclosed section 35, an open section 36, and a communicating hole 37 through which the enclosed section 35 and the open section 36 communicate.

The enclosed section 35 is for example a housing such as a rectangular prism or a circular cylinder, and the communicating hole 37 is provided in the lower part of a side surface of the enclosed section 35. In Embodiment 2, the enclosed section 35 is located closer to the inlet 12 than the first filter 90.

The enclosed section 35 forms an internal space in which the gas 3 is enclosed, and functions as a gas-liquid separation tank. That is, the liquid 2 and the gas 3 stored in the internal space in the enclosed section 35 are naturally separated by the effect of gravity so that the liquid 2 moves vertically downward in the internal space and the gas 3 moves vertically upward in the internal space. For this reason, as shown in FIG. 6, the gas 3 is stored in the upper part of the internal space in the enclosed section 35, and the liquid 2 is stored in the lower part of the internal space.

The internal space in the enclosed section 35 is enclosed except the parts connected with the first piping unit 30 and the second piping unit 70 and the communicating hole 37. That is, except the parts connected with the first piping unit 30 and the second piping unit 70 and the communicating hole 37, the enclosed section 35 has no opening through which the internal space and the outside (or the first space 14) communicate. This prevents the gas 3 that is stored in the enclosed section 35 from leaking to the outside except in a case where the gas 3 flows out of the internal space through the first piping unit 30, and also prevents the gas 3 from intruding into the inside except in a case where the gas 3 flows into the internal space through the second piping unit 70 (i.e. the fourth flow passage 72).

The open section 36 is a box like a tray that has its upper surface open. The open section 36 has its floor surface flush with the enclosed section 35 and enables the liquid 2 to move through the communicating hole 37 between the enclosed section 35 and the open section 36. In the open section 36, a part of the first filter 90 is disposed in contact with the liquid 2.

The communicating hole 37 is a hole provided to enable the liquid 2 to move between the enclosed section 35 and the open section 36. The communicating hole 37 is filled with the liquid 2 so that the gas 3 does not pass through the communicating hole 37.

It should be noted that the enclosed section 35 and the open section 36 may be separate tanks or two tanks connected to each other through pipes or the like. In this case, too, the pipes have their ends closed by the liquid 2 or the like so that gases do not flow into the pipes.

The first tank 34 is made, for example, of an acid-resistant resin or metal material or the like. For example, the first tank 34 is made of polyvinyl chloride, stainless steel, ceramic, or the like. It should be noted that in a case where the first tank 34 is made of a metal material, the first tank 34 may be subjected to plating, painting, or the like for rust-proof treatment.

It should be noted that the first tank 34 may be provided with an opening through which the liquid 2 is replaced. The opening is closed by a lid (or the liquid 2) or the like so that the gas 3 does not flow out at least for the duration of operation of the liquid treatment apparatus 200.

2-4. Second Tank

The second tank 38 is a tank inside of which the pair of electrodes 41 of the plasma generator 40 are disposed. The second tank 38 may have any outer shape such as a rectangular prism, a circular cylinder, or a sphere. In Embodiment 2, the second tank 38 has an internal space in which the liquid 2 is stored. In the example shown in FIG. 6, where the liquid 2 fills the entire internal space in the second tank 38, and the gas 3 only exists as the bubbles 4. Alternatively, the liquid 2 and the gas 3 may be separate from each other as they are in the first tank 34.

The second tank 38 functions as a reaction tank in which plasma is generated. Plasma is generated within the gas 3 (bubbles 4) supplied to the internal space in the second tank 38, so that nitrogen oxides and ozone are produced. The nitrogen oxides are supplied to the enclosed section 35 of the first tank 34 through the fourth flow passage 72 while dissolving in the liquid 2.

The internal space in the second tank 38 is enclosed except the parts connected with the first piping unit 30 and the second piping unit 70. That is, except the parts connected with the first piping unit 30 and the second piping unit 70, the second tank 38 has no opening through which the internal space and the outside communicate. This prevents the gas 3 from leaking to the outside except in a case where the gas 3 flows into the internal space through the first piping unit 30, and also prevents the gas 3 from intruding into the inside except in a case where the gas 3 flows out of the internal space through the second piping unit 70 (i.e. the fourth flow passage 72).

Although, as shown in FIG. 6, the second tank 38 is disposed outside of the housing 11, this does not imply any limitation. The second tank 38 may alternatively be disposed within the housing 11. For example, the second tank 38 may be disposed in the first space 14. This allows nitrogen oxides having leaked from the second tank 38, if any, to be dissolved in the liquid 2 by the first filter 90. This makes it possible to reduce the quantity of nitrogen oxides that are emitted out of the housing 11.

The second tank 38 is made, for example, of an acid-resistant resin or metal material or the like. For example, the second tank 38 is made of polyvinyl chloride, stainless steel, ceramic, or the like. It should be noted that in a case where the second tank 38 is made of a metal material, the second tank 38 may be subjected to plating, painting, or the like for rust-proof treatment.

It should be noted that the second tank 38 may be a part of the second piping unit 70. That is, the pair of electrodes 41 may be disposed inside of the second piping unit 70.

2-5. First Filter

The first filter 90 is an example of a gas-liquid contact member disposed to intersect the gas flow. The first filter 90 brings the liquid 2 the gas 5 taken in through the inlet 12 into contact with each other. Specifically, the first filter 90 allows the gas to pass through it and takes the substances contained in the gas 5 into the liquid 2.

For example, the first filter 90 is rotated by rollers 91 and 92. Specifically, while having its lower part in contact with the liquid 2, the first filter 90 is wound around the two rollers 91 and 92 disposed one above the other. Rotation of the two rollers 91 and 92 causes the first filter 90 to rotate to make contact with the liquid 2 part by part. This allows the liquid 2 to spreads through every part of the first filter 90.

The first filter 90 is disposed so that a part of the first filter 90 is in contact with the liquid 2 in the open section 36 of the first tank 34. When seen along a gas flow direction (toward the right in FIG. 6), the first filter 90 is shaped and disposed so that no gap is formed between the first filter 90 and an inside surface of the housing 11. That is, the gas 5 does not substantially travel from the first space 14 to the second space 15 without passing through the first filter 90. It should be noted that a frame member shaped in conformance with the outside of the first filter 90 may be provided to fill a gap between the first filter 90 and the inside surface of the housing 11.

The first filter 90 is a member that increases the area of the liquid 2 that makes contact with the gas 5. For example, the first filter 90 is a large-area-contact-type porous member made of stainless steel or a chemical product. The large-area-contact-type porous member is for example a porous plate having a plurality of fine pores formed therein. An average pore of the first filter 90 is for example not greater than several millimeters. An average pore of the first filter 90 is simply equivalent, for example, to the average of a plurality of pores that appear in a given cross-section. The gas 5 is captured by these pores, and this makes it easier for the gas 5 to make contact with the liquid 2. The gas 5 captured by the first filter 90 makes contact with the active species, such as nitrous acid, contained in the liquid 2. This allows the matter to be decomposed contained in the gas 5 to be decomposed.

It should be noted that the first filter 90 may alternatively be an air-permeable and water-absorbing cloth member. The first filter 90 may have a plurality of short fine hairs for a larger surface area.

2-6. Gas Supply Pump

The gas supply pump 20 is an example of a gas supply apparatus that collects the gas 3 that is stored in the first tank 34 and supplies the gas 3 thus collected to the area near the pair of electrodes 41 of the plasma generator 40. Specifically, the gas supply pump 20 has a gas collection port 21 and a gas supply port 22. The gas supply pump 20 collects the gas 3 through the gas collection port 21 and emits the gas 3 thus collected through the gas supply port 22.

In Embodiment 2, the gas supply pump 20 is connected to the enclosed section 35 of the first tank 34 and the second tank 38 through the first piping unit 30 forming the first flow passage 31 and the second flow passage 32. Specifically, the first flow passage 31 is connected to the gas collection port 21, and the second flow passage 32 is connected to the gas supply port 22. That is, the gas supply pump 20 is disposed in the middle of the first piping unit 30 (i.e. between the first flow passage 31 and the second flow passage 32).

The gas supply pump 20 allows the gas 3 to flow through the enclosed section 35 of the first tank 34, the first flow passage 31, the second flow passage 32, and the second tank 38 in this order. The gas 3 having entered the second tank 38 is supplied to the first tank 34 through the fourth flow passage 72 with the flow of the liquid 2 formed by the liquid supply pump 80. That is, as shown in FIG. 6, the gas 3 circulates through the enclosed section 35, the first flow passage 31, the gas supply pump 20, the second flow passage 32, the second tank 38, the fourth flow passage 72, and the enclosed section 35 in this order. It should be noted that, in FIG. 6, the dashed arrows indicate the direction of flow of the gas 3.

Although, in Embodiment 2, the gas supply pump 20 is disposed in the first space 14 of the housing 11, this does not imply any limitation. The gas supply pump 20 may be disposed outside of the housing 11. Alternatively, the gas supply pump 20 may be provided inside of the enclosed section 35.

2-7. Liquid Supply Pump

The liquid supply pump 80 is an example of a liquid supply apparatus that circulates the liquid 2 through the first tank 34, the third flow passage 71, the second tank 38, and the fourth flow passage 72 in this order. Specifically, the liquid supply pump 80 has an inlet 81 and an outlet 82. The liquid supply pump 80 sucks in the liquid 2 through the inlet 81 and releases the liquid 2 thus sucked in through the outlet 82. This causes the liquid 2 stored in the first tank 34 to be circulated through the upstream part 71a of the third flow passage 71, the liquid supply pump 80, the downstream part 71b of the third flow passage 71, the second tank 38, the fourth flow passage 72, and the first tank 34 in this order. It should be noted that, in FIG. 6, the solid arrows indicate the direction of flow of the liquid 2.

The liquid supply pump 80 is disposed in the middle of the second piping unit 70. Specifically, the liquid supply pump 80 is connected between the upstream 71a of the third flow passage 71 and the downstream part 71b. Alternatively, the liquid supply pump 80 may be disposed within the first tank 34 or the second tank 38. Further, although the liquid supply pump 80 is disposed outside of the housing 11, this does not imply any limitation. The liquid supply pump 80 may alternatively be disposed inside of the housing 11.

2-8. Plasma Generator

The plasma generator 40 is an example of a plasma generating apparatus including the pair of electrodes 41 and a power source 42. The plasma generator 40 produces nitrogen oxides by effecting discharge between the electrodes 41 and thereby so generating plasma in the gas (bubbles 4) supplied by the gas supply pump 20 that the plasma makes contact with the liquid 2. A part of the nitrogen oxides thus produced dissolves in the liquid 2, and a part of the nitrogen oxides that did not dissolve in the liquid 2 is stored in the first tank 34. That is, the gas 3 that is stored in the first tank 34 contains not only nitrogen and oxygen but also gases, such as nitrogen oxides and ozone, produced by the plasma generator 40.

The pair of electrodes 41 are disposed inside of the second tank 38. Specifically, the pair of electrodes 41 are disposed to make contact with the liquid 2 stored in the second tank 38. The pair of electrodes 41 are made from two electrodes placed at a predetermined distance from each other, and one of the electrodes is covered with the gas supplied by the gas supply pump 20. The pair of electrodes 41 are for example a pair of rod electrodes, parallel plate electrodes, or the like.

The power source 42 applies a negative high-voltage pulse voltage, for example, of 2 to 50 kV/cm and 100 Hz to 20 kHz between the electrodes 41. This effects discharge in the gas (bubbles 4), generates plasma, and thereby produces nitrogen oxides.

2-9. First Piping Unit

The first piping unit 30 is a structure for forming flow passages through which the gas 3 flows. For example, the first piping unit 30 is formed from tubular members such as pipes, tubes, hoses. The first piping unit 30 is made of a resin material, a metal material, or the like that has resistance to an active gas, such as ozone, which is produced by the plasma. For example, the first piping unit 30 is made of fluororesin such as polytetrafluoroethylene, silicone rubber, stainless steel, or the like.

As shown in FIG. 6, the first piping unit 30 forms the first flow passage 31, the second flow passage 32, and the exhaust flow passage 33.

The first flow passage 31 is a flow passage through which the gas 3 containing nitrogen oxides is guided from the first tank 34 to the gas supply pump 20. As shown in FIG. 6, the first flow passage 31 has a first end (upstream end) connected to the upper part of the internal space in the enclosed section 35. For example, the upstream end is located in a position out of contact with the liquid 2 within the enclosed section 35 so that only the gas 3 passes through the inside of the first flow passage 31. The first flow passage 31 has a second end (downstream end) connected to the gas collection port 21 of the gas supply pump 20. The gas supply pump 20 sucks up the gas 3 stored in the upper part of the internal space in the enclosed section 35 and thereby collects the gas 3 through the first flow passage 31.

The second flow passage 32 is a flow passage through which the gas collected by the gas supply pump 20 is guided from the gas supply pump 20 to the area near the pair of electrodes 41. The second flow passage 32 has a first end (upstream end) connected to the gas supply port 22 of the gas supply pump 20 and a second end (downstream end) connected to the area near the electrode pair 41 disposed within the second tank 38. For example, the downstream end is connected to the root of one of the pair of electrodes 41 so that the gas having passed through the second flow passage 32 covers the electrode.

The exhaust flow passage 33 is a flow passage through which a part of the gas 3 that is stored in the first tank 34 is emitted. In Embodiment 2, as shown in FIG. 6, the exhaust flow passage 33 branches off from the first flow passage 31.

It should be noted that the exhaust flow passage 33 may alternatively branch off from the second flow passage 32. Alternatively, the exhaust flow passage 33 may be an opening provided in the enclosed section 35. That is, the enclosed section 35 may be provided with an exhaust opening as the exhaust gas passage 33, in addition to the opening through which the enclosed section 35 is connected to the first piping unit 30 (i.e. the first flow passage 31 and the second flow passage 32).

In Embodiment 2, heat is generated when the plasma generator 40 generates the plasma. The heat thus generated causes a rise in temperature of the gas 3, thus causing an increase in volume of the gas 3. Further, the evaporation of the liquid 2 at the interface between the plasma and the liquid 2 also causes an increase in volume. This causes an increase in internal pressure in the first tank 34. The exhaust flow passage 33 is provided for, in a case where the volume of the gas 3 increases, emitting the increase to the outside.

It should be noted that a valve (e.g. a check valve) may be provided in the part where the exhaust flow passage 33 branches off from the first flow passage 31. The valve opens in a case where the pressure of the gas 3 in the first tank 34 becomes higher than a predetermined threshold pressure. This makes it possible to suppress the rise in internal pressure in the first tank 34 or the like and thereby prevent the first tank 34, the first piping unit 30, and the like from being deformed or damaged.

2-10. Second Piping Unit

The second piping unit 70 is a structure for forming flow passages through which the liquid 2 flows. For example, the second piping unit 70 is formed from tubular members such as pipes, tubes, hoses. The second piping unit 70 is made of an acid-resistant resin or metal material or the like. For example, the second piping unit 70 is made of polyvinyl chloride, polytetrafluoroethylene, stainless steel, or the like.

As shown in FIG. 6, the second piping unit 70 forms the third flow passage 71 and the fourth flow passage 72.

The third flow passage 71 is a flow passage through which the liquid 2 in the first tank 34 is guided to the second tank 38. Specifically, the third flow passage 71 has an upstream part 71a and a downstream part 71b. The liquid supply pump 80 is connected between the upstream part 71a and the downstream part 71b.

The upstream part 71a is a flow passage through which the liquid 2 in the first tank 34 is guided to the liquid supply pump 80. The upstream part 71a has a first end (upstream end) located in a position in contact with the liquid 2 in the internal space in the first tank 34. For example, although the upstream end of the upstream part 71a is connected to a lower part of the enclosed section 35, the upstream end may alternatively be connected to the open section 36. Alternatively, the upstream end may be connected to a bottom surface of the first tank 34. The upstream part 71a has a second end (downstream end) connected to the inlet 81 of the liquid supply pump 80.

The downstream part 71b is a flow passage through which the liquid 2 is guided from the liquid supply pump 80 to the second tank 38. The downstream part 71b has a first end (upstream end) connected to the outlet 82 of the liquid supply pump 80. The downstream part 71b has a second end (downstream end) connected to the second tank 38.

The fourth flow passage 72 is a flow passage through which the gas 3 supplied to the area near the pair of electrodes 41 within the second tank 38 and the liquid 2 that is stored in the second tank 38 are guided to the first tank 34. Reduced to its simplest terms, the fourth flow passage 72 is a flow passage through which both the gas 3 and the liquid 2 flow. Specifically, the fourth flow passage 72 is a part of a route of circulation of the gas 3 and also a part of a route of circulation of the liquid 2. The fourth flow passage 72 has a first end (upstream end) connected to the second tank 38 and a second end (downstream end) connected to the first tank 34. As shown in FIG. 6, the downstream end may be located in the upper part of the internal space in the enclosed section 35.

2-11. Second Filter

The second filter 95 is a filter that allows passage of a part of the gas 3 and blocks passage of nitrogen oxides. Specifically, the second filter 95 allows passage of nitrogen and oxygen and blocks passage of nitrogen oxides. For example, the second filter 95 may be a $NO_x$-dedicated filter or an activated carbon filter.

It should be noted that blocking passage of nitrogen oxides includes substantially blocking passage of nitrogen oxides while slightly allowing passage of nitrogen oxides instead of completely shut out nitrogen oxides. That is, the second filter 95 needs only be a filter that makes the amount of passage of nitrogen oxides smaller than a predetermined threshold amount. For example, the amount of passage of nitrogen oxides through the second filter 95 is smaller than a value prescribed by regulations such as environmental standards.

The second filter 95 is disposed on the exhaust flow passage 33. That is, the gas 3 flowing through the exhaust flow passage 33 has its nitrogen oxides removed by the second filter 95 when the gas 3 passes through the second filter 95. With this, the gas 3 that is emitted through the exhaust flow passage 33 to the outside contains almost no nitrogen oxides.

In Embodiment 2, the second filter 95 is disposed within the first space 14 of the housing 11. This allows the gas 3 that is emitted from the exhaust flow passage 33 through the second filter 95 to pass through the first filter 90 with the gas flow (flow of the gas 5) that moves from the inlet 12 to the outlet 13. For this reason, even if the gas 3, when emitted, contains a part of nitrogen oxides that remains after the rest of them has been removed by the second filter 95, the first filter 90 makes it easier for the remaining nitrogen oxides to make contact with the liquid 2. This makes it easier for the remaining nitrogen oxides to dissolve in the liquid 2, thus making it possible to reduce emissions of nitrogen oxide out of the housing 11.

It should be noted that the second filter 95 may be disposed outside of the housing 11. That is, the exhaust flow passage 33, too, may be disposed outside of the housing 11.

3. Summary

As described above, a liquid treatment apparatus 200 according to Embodiment 2 includes: a housing 11 having an inlet 12 and an outlet 13; a fan 23 or 24 that produces a gas flow so that a gas 5 is taken into the housing 11 through the inlet 12 or so that a gas 6 is emitted out of the housing 11 through the outlet 13; a first tank 34, disposed within the housing 11, in which a gas 3 containing nitrogen and oxygen and a liquid 2 are stored; a first filter 90, disposed to intersect the gas flow, which brings the liquid 2 and the gas 5 taken in through the inlet 12 into contact with each other; a gas supply pump 20 that collects the gas 3 that is stored in the first tank 34 and supplies the gas 3 thus collected to an area near a pair of electrodes 41; and a plasma generator 40, including the pair of electrodes 41, which produces nitrogen oxides by effecting discharge between the electrodes 41 and thereby so generating plasma in the gas 3 supplied by the gas supply pump 20 that the plasma makes contact with the liquid 2, wherein the gas 3 that is stored in the first tank 34 contains the nitrogen oxides produced by the plasma generator 40.

This reduces emissions of nitrogen oxides, thus making it possible to sufficiently reduce the influence on the outside. Therefore, the liquid treatment apparatus 200 can be utilized in unlimited operating environments and operating conditions. That is, the liquid treatment apparatus 200 can be utilized as a highly-versatile device.

Modification 1 of Embodiment 2

The following describes a liquid treatment apparatus according to Modification 1 of Embodiment 2.

FIG. 7 is a diagram showing a configuration of a liquid treatment apparatus 300 according to the present modification. As shown in FIG. 7, the liquid treatment apparatus 300 differs from the liquid treatment apparatus 200 according to Embodiment 2 shown in FIG. 6 in that the liquid treatment apparatus 300 does not include the second tank 38, the second piping unit 70, or the liquid supply pump 80. That is, the liquid treatment apparatus 300 according to the present modification does not circulate the liquid 2.

In the present modification, as shown in FIG. 7, the pair of electrodes 41 of the plasma generator 40 are disposed within the first tank 34. Specifically, the pair of electrodes 41 are disposed within the enclosed section 35 of the first tank 34. This causes nitrogen oxides produced in the area near the pair of electrodes 41 to be released into the internal space in the enclosed section 35 and thus prevents the nitrogen oxides from leaking to the outside (such as the first space 14). The second flow passage 32, through which the gas 3 is supplied to the area near the pair of electrodes 41, is connected to the enclosed section 35 of the first tank 34.

In the present modification, the gas supply pump 20 allows the gas 3 to flow through the enclosed section 35, the first flow passage 31, the second flow passage 32, and the enclosed section 35 in this order. That is, the gas 3 circulates through the enclosed section 35, the first flow passage 31, the gas supply pump 20, the second flow passage 32, and the enclosed section 35 in this order. It should be noted that although FIG. 7 shows an example where the exhaust flow passage 33 branches off from the second flow passage 32, the exhaust flow passage 33 may alternatively branch off from the first flow passage 31 as in the case of Embodiment 2.

According to the present modification, the number of components can be reduced, as the liquid treatment apparatus 300 does not need to include the second tank 38 or the like. This makes it possible to achieve reductions in size, weight, and cost of the liquid treatment apparatus 200.

Modification 2 of Embodiment 2

Next, a liquid treatment apparatus according to Modification 2 of Embodiment 2 is described.

Figure 8:
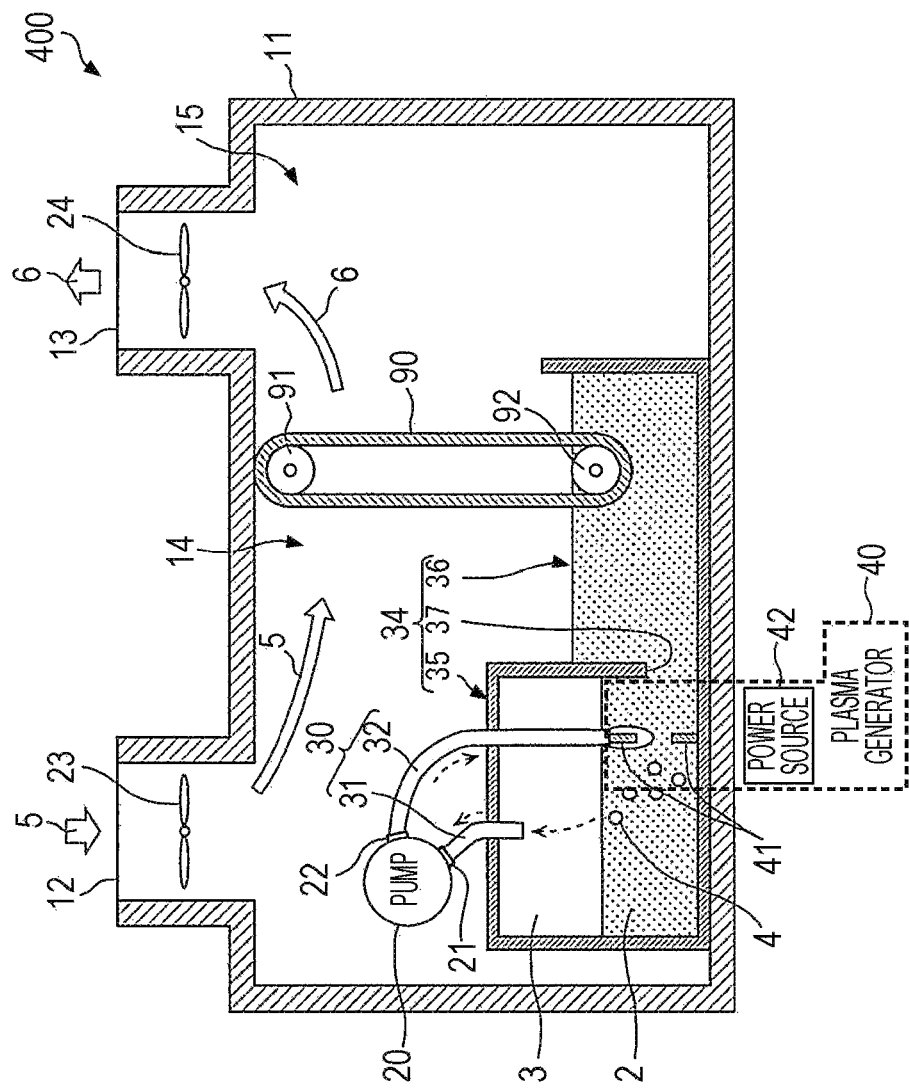
FIG. 8 is a diagram showing a configuration of a liquid treatment apparatus according to Modification 2 of Embodiment 2.

FIG. 8 is a diagram showing a configuration of a liquid treatment apparatus 400 according to the present modification. As shown in FIG. 8, the liquid treatment apparatus 400 differs from the liquid treatment apparatus 300 according to Modification 1 shown in FIG. 7 in that the liquid treatment apparatus 400 does not include the exhaust flow passage 33 or the second filter 95. That is, the liquid treatment apparatus 400 according to the present modification is not provided with a route through which the gas 3 escapes in the case of an increase in volume of the gas 3.

As mentioned above, a rise in temperature of the gas 3 due to the generation of plasma or the like leads to an increase in volume of the gas 3. In the present modification, in which the enclosed section 35 and the open section communicate through the communicating hole 37, the liquid 2 can flow from the enclosed section 35 to the open section 36. Therefore, in the case of an increase in volume of the gas 3, the gas 3 presses down the liquid surface of the liquid 2 in the enclosed section 35, thereby causing the liquid 2 to flow from the enclosed section 35 to the open section 36 through the communicating hole 37. This leads to a rise in liquid surface of the liquid 2 in the open section 36.

Thus, in the liquid treatment apparatus 400 according to the present modification, an increase in volume of the gas 3 can be absorbed by the flowing of the liquid 2. This makes it possible to suppress an increase in internal pressure in the enclosed section 35 and thereby prevent the enclosed section 35, for example, from being deformed or damaged. Therefore, the liquid treatment apparatus 400 according to the present modification can be utilized in unlimited operating environments and operating conditions.

Other Embodiments

In the foregoing, embodiments of a control switch according to one or more aspects have been described. However, the present disclosure is not limited to these embodiments. An embodiment obtained by subjecting any of these embodiments to various modifications that persons skilled in the art can conceive of and an embodiment obtained by combining constituent elements of different embodiments are encompassed in the scope of the present disclosure, provided such embodiments do not depart from the spirit of the present disclosure.

For example, although an embodiment described above has shown an example where the gas supply pump 20 is disposed outside of the first tank 10, the gas supply pump may alternatively be disposed within the first tank 10, for example, in a modification described above. In this case, the liquid treatment apparatus 1 does not need to be provided with the first flow passage 31, and the gas supply pump 20 may take in the gas 3 in the first tank 10 and supply the gas 3 to the area near the pair of electrodes 41.

Further, for example, although an embodiment described above has shown an example where plasma is generated in the gas 3 (bubbles 4) supplied into the liquid 2, this does not imply any limitation. For example, the pair of electrodes 41 may be disposed near an area above the liquid surface of the liquid 2 to generate plasma so that the plasma makes contact with the liquid surface. In this case, nitrogen oxides produced in the area near the liquid surface by the plasma can make contact with the liquid 2 and dissolve in the liquid 2.

Further, each of the embodiments described above may be subjected to various changes, substitutions, additions, omissions, and the like in the scope of the claims or the scope of equivalents of the claims.

The present disclosure can be utilized as a liquid treatment apparatus that can be utilized in unlimited operating environments and operating conditions and, for example, can be utilized in a purification apparatus that purifies a liquid such as water, an air purifier, and the like.

What is claimed is:

1. A liquid treatment apparatus comprising:
   a first tank in which a first gas containing nitrogen and oxygen and a liquid are stored;
   a plasma generating apparatus, including a first electrode and a second electrode, which effects discharge between the first electrode and the second electrode and thereby generates plasma that makes contact with at least part of the liquid;
   a gas supply apparatus that supplies a first part of the first gas from the first tank to the plasma generating apparatus;
   a first flow passage connected to the first tank and to the gas supply apparatus, to guide the first part of the first gas from the first tank into the gas supply apparatus; and
   a second flow passage connected to the gas supply apparatus and to the first tank, an end of the second flow passage being directly connected to a root of the first or second electrode so that the first part of the first gas covers the first or second electrode.

2. The liquid treatment apparatus according to claim 1, wherein
   the first flow passage is a pipe, tube, or hose, and
   the second flow passage is a pipe, tube, or hose.

3. The liquid treatment apparatus according to claim 1, further comprising:
   an exhaust flow passage through which a second part of the first gas in the first tank is emitted from the first tank; and
   a first filter, disposed on the exhaust flow passage, which removes nitrogen oxides from the second part of the first gas.

4. The liquid treatment apparatus according to claim 3, wherein the exhaust flow passage branches off from the first flow passage or the second flow passage.

5. The liquid treatment apparatus according to claim 1, wherein the first electrode and the second electrode are disposed inside of the first tank.

6. The liquid treatment apparatus according to claim 1, further comprising:
   a housing, including an inlet and an outlet, which accommodates the first tank;
   a fan that produces, in the housing, a flow of a second gas that moves from the inlet to the outlet; and
   a second filter, having a principal surface intersecting the flow of the second gas, which brings the liquid in the first tank and the second gas into contact with each other.

7. The liquid treatment apparatus according to claim 1, wherein the plasma generating apparatus is configured such that nitrogen oxides are produced by generation of the plasma.

* * * * *